Figure 2:
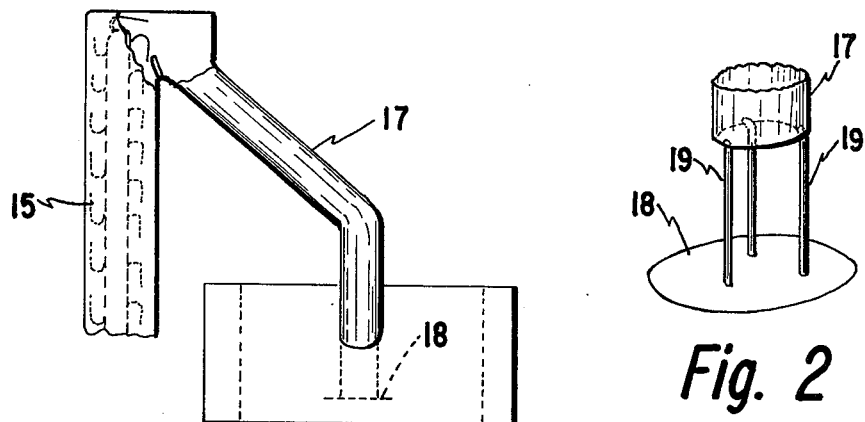

United States Patent [19]

Ellsworth

[11] 4,118,798
[45] Oct. 3, 1978

[54] METHOD OF MIXING FERTILIZER

[76] Inventor: Clayton S. Ellsworth, 203 S. 17th St., Norfolk, Nebr. 68701

[21] Appl. No.: 827,838

[22] Filed: Aug. 25, 1977

Related U.S. Application Data

[62] Division of Ser. No. 631,894, Nov. 14, 1975, abandoned.

[51] Int. Cl.² .............................................. B01F 7/00
[52] U.S. Cl. .................................................. 366/156
[58] Field of Search ....................... 366/20, 33, 35, 50, 366/131, 133, 134, 336, 337, 340, 152, 156; 222/412, 413

[56] References Cited

U.S. PATENT DOCUMENTS

| 922,863 | 5/1909 | Dor-Delattre | 366/133 |
| 2,085,263 | 6/1937 | Lauterbur | 366/156 |
| 2,252,589 | 8/1941 | Whitmore et al. | 366/156 |
| 3,155,377 | 11/1964 | Godman | 366/340 |

Primary Examiner—Leonard D. Christian

[57] ABSTRACT

A mixing method particularly usable for fertilizers, comprising placing layers of material in a sectional storage bin having an auger conveyor for conveying material therefrom, emptying the compartments serially thus causing a primary mixing, moving the fertilizer from the bin to a point where it can be dropped into a mixing bin, dropping the material onto a diffuser adapted to spread the fertilizer as it drops into a sectional mixing bin, and removing the material from the mixing bin by means of a second auger and delivering it to a conveyance.

2 Claims, 3 Drawing Figures

U.S. Patent

Oct. 3, 1978

4,118,798

METHOD OF MIXING FERTILIZER

This application is a divisional application of my previously filed application Ser. No. 631,894, filed Nov. 14, 1975 and now abandoned.

BACKGROUND AND SUMMARY OF THE INVENTION

This invention pertains to methods of mixing and more particularly to mixing particulate materials such as agricultural fertilizer.

Present day agriculture is greatly dependent on the use of correct fertilizer to produce an adequate yield of grain to be profitable to the farmer and to provide food for the world. However, soil nutrients present in the soil may vary considerably from area to area and even from one field to another dependent on soil characteristics and on previous cropping. Therefore, proper and efficient use of fertilizer will require different mixtures of materials from farm to farm and even from field to field.

At the present time mixing is accomplished principally by loading measured amounts of material into a large rotating drum and allowing the drum to rotate for a length of time and then, when the mixture is thoroughly mixed unloading the drum into a conveyance. Thus, only a limited amount of material can be mixed at a given time, dependent on the size of the drum. Further, the rotation of the drum requires a considerable expenditure of energy.

By using my method, the energy requirement may be reduced. I can also provide for more continuous mixing of larger amounts of fertilizer. My device in not limited to small batch mixing amounts but can be used for both large and small amounts selectively. Also, I achieve a very thorough mixing by use of my method.

FIGURES

Figure 3:
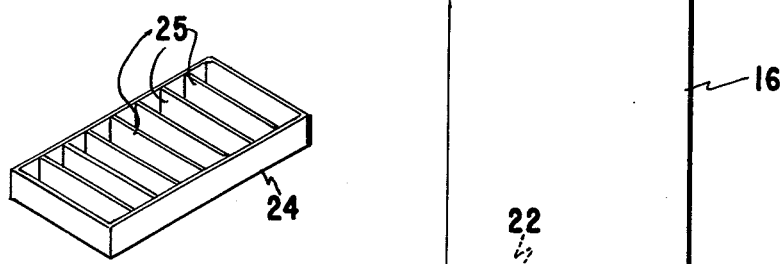
Figure 1:
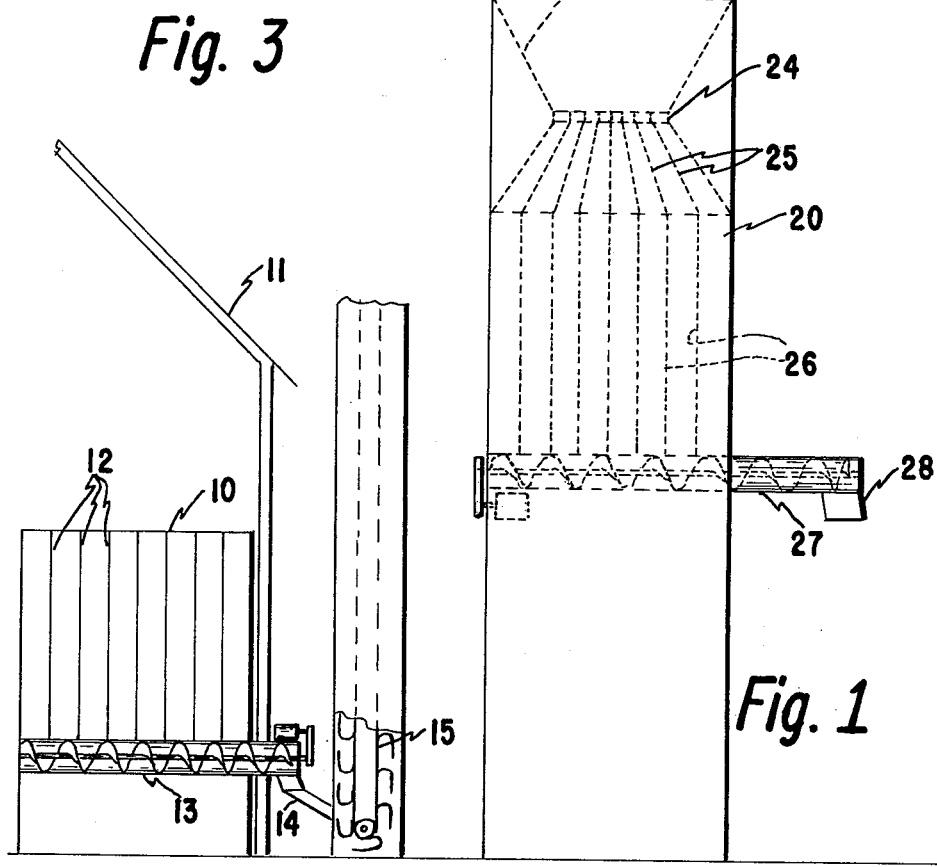

FIG. 1 is a sectional elevational view of the entire system which achieves my method, FIG. 2 is a detailed view, to an enlarged scale, of the diffuser on the delivery pipe, and FIG. 3 is a detailed view, to an enlarged scale, of the entrance to the compartmented final bin.

DESCRIPTION

Briefly my invention comprises a method for the mixing of particulate materials using compartmented bins with auger transports for removing the materials from the bins.

More specifically and referring to the drawings, my device includes a premixing bin 10 which may be enclosed in a larger building 11 used for the storage of the various component material used in mixing agricultural fertilizer. The premixing bin is divided into compartments by dividing walls 12. This bin may be loaded by means of conveyor means including spouts or chutes, or may be filled by a front end loader. In either case, the material is preferably deposited across all the compartments, if effect forming layers of material.

The bin 10 is tapered at the bottom to an auger conveyor 13 of customary type. This conveyor discharges into a spout 14 which in turn delivers the material to a lifting leg 15. The leg 15 elevates the material to the top of a final mixing bin 16 and delivers the material through a pipe 17 to that bin. A diffuser plate 18 is fixed to the pipe 17 and is spaced from the end of the pipe by rods 19 strong enough to hold the plate in place as the fertilizer material hits and is spread by the plate 18.

An open space is provided in the bin 16 beneath the plate 18. This allows either for holding of the partially mixed material, if desired, or for some added mixing simply by the falling of the material. At the bottom of the space, I provide a second compartmented bin 20. At the entrance to this bin is a baffled chute 21 whose entrance is best shown in FIG. 3.

The tapered section 22 is preferably pyramidal in shape so that the material is collected to a smaller rectangular entrance 24. A slide gate may be provided above the entrance 24 to hold the material until the premixer has fully discharged its contents into the open space. Then, the gate could be opened to discharge into the compartmented bin 20. The entrance 24 is provided with baffles 25 leading to walls 26 in the bin 20. This bin is also tapered at its base to feed an auger conveyor 27 adapted to discharge the material from a discharge spout 28 into a truck, wagon or fertilizer spreading conveyance. Thus the material can be moved from the initial premixing bin 10 to the conveyance by a completely automatic system.

I have discovered that the material from a series of compartments transverse of an auger is carried by the auger first from the compartment farthest from the exit, and is run beneath the other compartments to pick up only small amounts from those and least from the compartment nearest the exit. However, in the carrying, the material is rather well mixed as it passes. Thus, as the material is removed from the premixing bin 10, it is fairly well mixed to a preliminary mixed state.

The elevation by the leg 15 is necessary only to be able to run the material over the diffuser plate 18 and deliver it to the bin 16. If the component materials are elevated so that the premixing bin can be placed high enough, delivery could be made directly to the pipe 17.

As the materials are collected in the compartments in the bin 20, they are already fairly well mixed. However, the second auger 27 as it removes materials from these compartments provides a very thorough mixture so that the total mixture of materials is substantially uniform. Any chunks of material will be broken up in the process and the approach to the desired uniformity is much greater by this means than by the presently used batch mixture.

Also, by the use of my system less energy will be required. The augers require only relatively small amounts of energy to operate. The only large energy requirement is in the operation of the leg 15 which elevates the materials. However, this is only a single lifting compared to the continuous lifting and falling in a batch mixer, and it also provides whatever elevation is necessary to deliver the fertilizer to its final conveyor.

Thus, I provide a more nearly uniform mixture at the expenditure of less energy.

I claim:

1. Method of mixing a fertilizer or the like composed of a plurality of ingredients which comprises serially delivering said ingredients to a compartmented bin, successively placing each ingredient into all the bins whereby layers of said ingredients are formed, discharging said ingredients from said compartments into a mixing auger running beneath said compartments in consecutive order whereby said ingredients are partially mixed, delivering said partially mixed ingredients from said auger to a discharge means, mixing said ingredients a second time by discharging the ingredients over a diffuser means and mixing the ingredients a third time by running said ingredients through a discharge auger.

2. The method of claim 1 in which said fertilizer material is delivered from said diffuser means into a second compartmented bin, and runs from the compartments in said second bin to said discharge auger.

* * * * *